United States Patent [19]
Morine et al.

[11] 3,885,471
[45] May 27, 1975

[54] GUARD ASSEMBLY FOR ENDLESS FLEXIBLE DRIVE MEMBERS

[75] Inventors: Richard L. Morine, Mentor; James J. Hokes, Lakewood, both of Ohio

[73] Assignee: Fedco Inc., Mentor, Ohio

[22] Filed: Feb. 25, 1974

[21] Appl. No.: 445,748

Related U.S. Application Data

[63] Continuation of Ser. No. 338,873, March 7, 1973.

[52] U.S. Cl. .................................. 74/611; 74/240
[51] Int. Cl. ............................................. F16p 1/00
[58] Field of Search ............................ 74/611, 240

[56] References Cited
UNITED STATES PATENTS

| | | | |
|---|---|---|---|
| 1,406,878 | 2/1922 | Leonard | 74/611 X |
| 1,491,594 | 4/1924 | Ernst | 74/240 |
| 1,788,992 | 1/1931 | Ecabert | 74/611 |
| 1,971,311 | 8/1934 | Chapman | 74/611 |
| 2,607,241 | 8/1952 | Peterson | 74/611 |

FOREIGN PATENTS OR APPLICATIONS

23,457   11/1898   United Kingdom.................. 74/611

Primary Examiner—Samuel Scott
Assistant Examiner—F. D. Shoemaker
Attorney, Agent, or Firm—Daniel G. Blackhurst

[57] ABSTRACT

The specification and drawings disclose a guard assembly for belt and chain drives. The assembly is disclosed as a two-part structure adapted to fit about and totally enclose the pulley or sprocket and a substantial length of both the upper and lower runs of the belt or chain. According to the disclosure, the guard assembly is preferably supported at two locations including a first bearing surface which engages the shaft carrying the pulley or sprocket and a second surface which engages the belt or chain. Modifications of the invention are disclosed which permit the guard assembly to be adapted for totally enclosing both sprockets and the upper and lower runs of the belt or chain.

11 Claims, 17 Drawing Figures

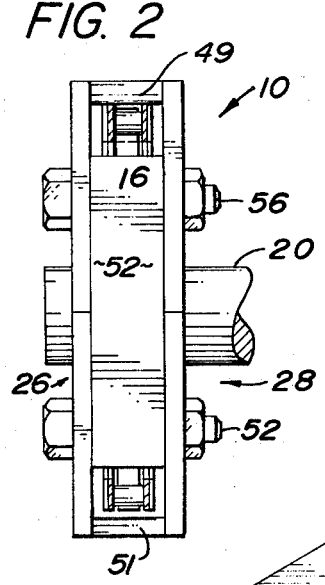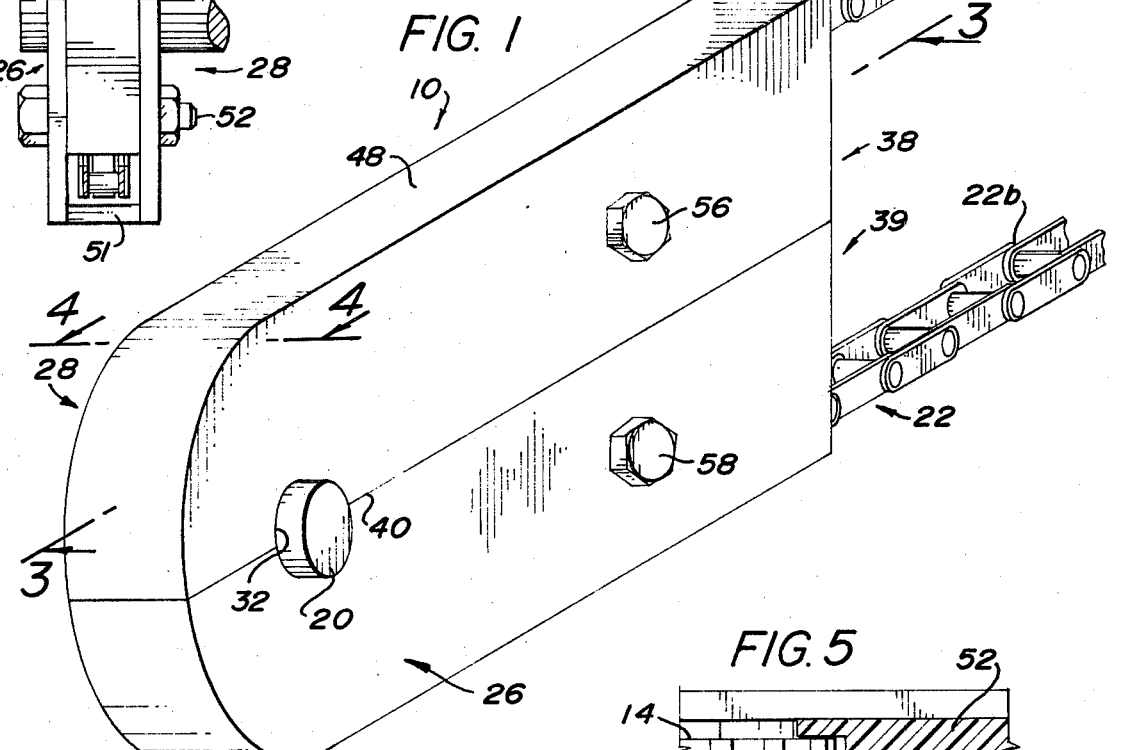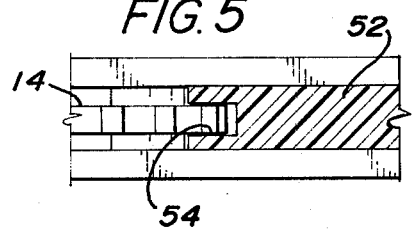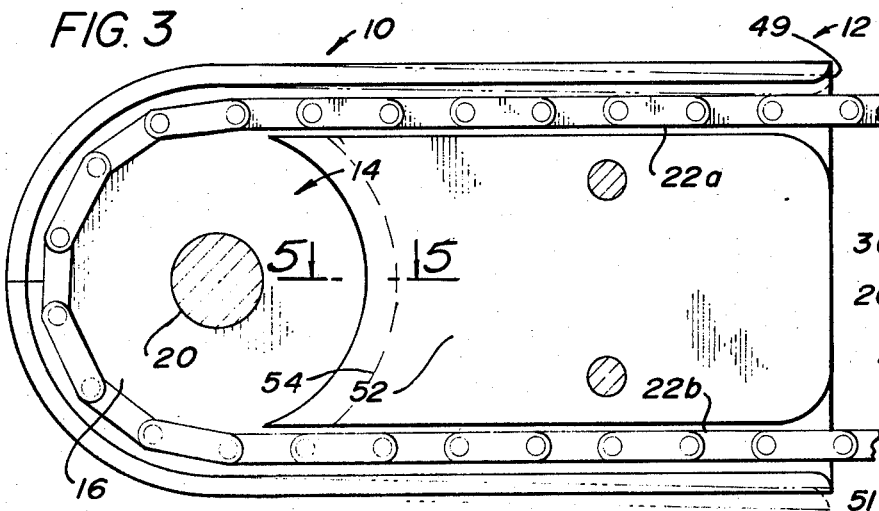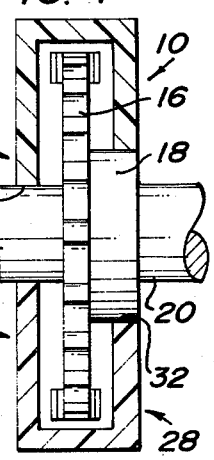

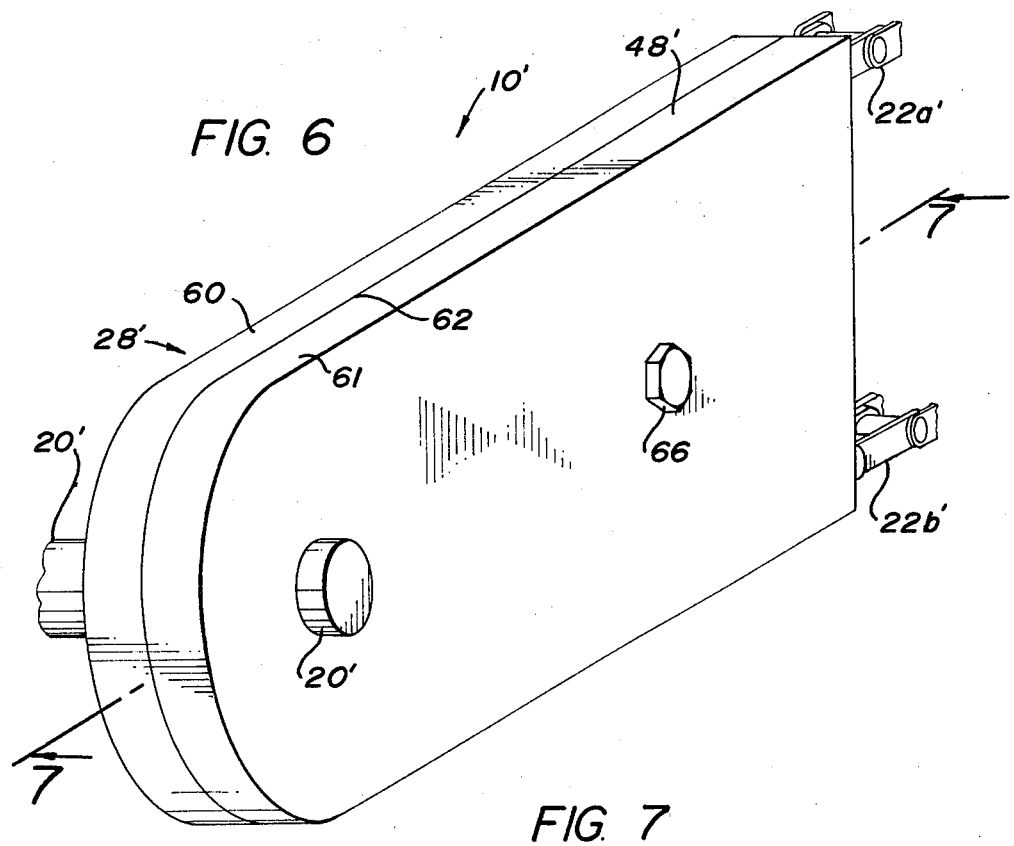
FIG. 6
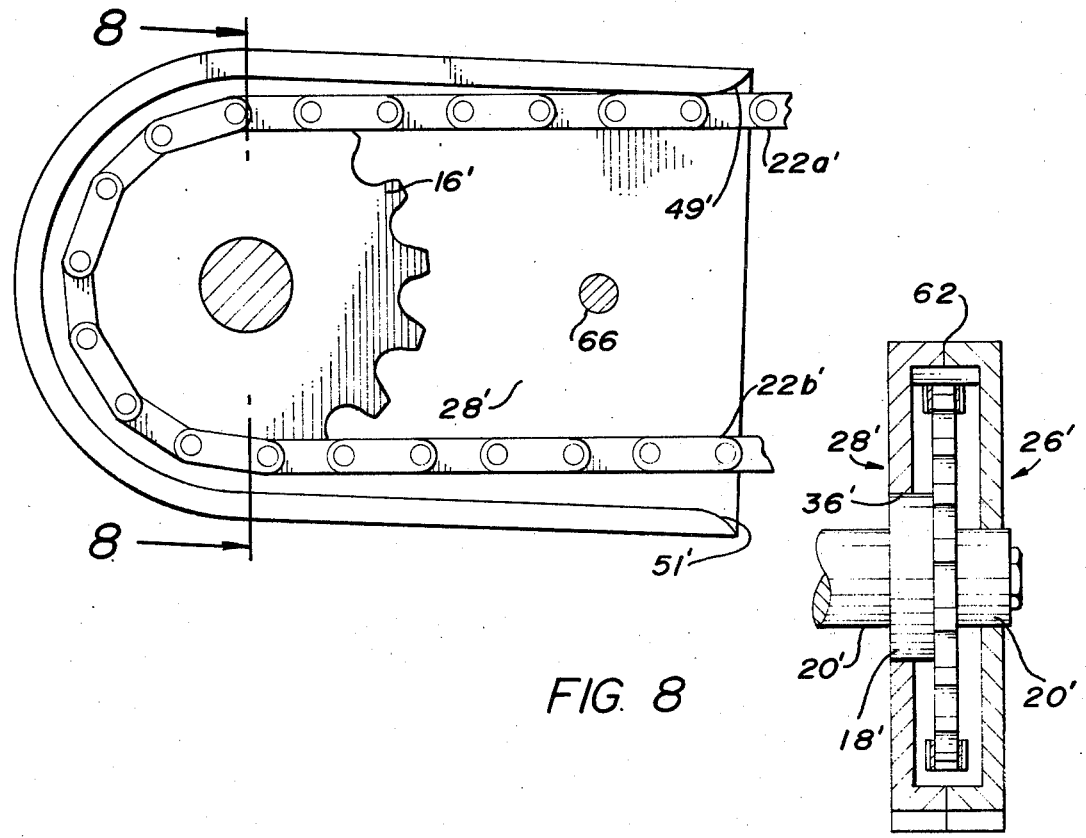
FIG. 7
FIG. 8

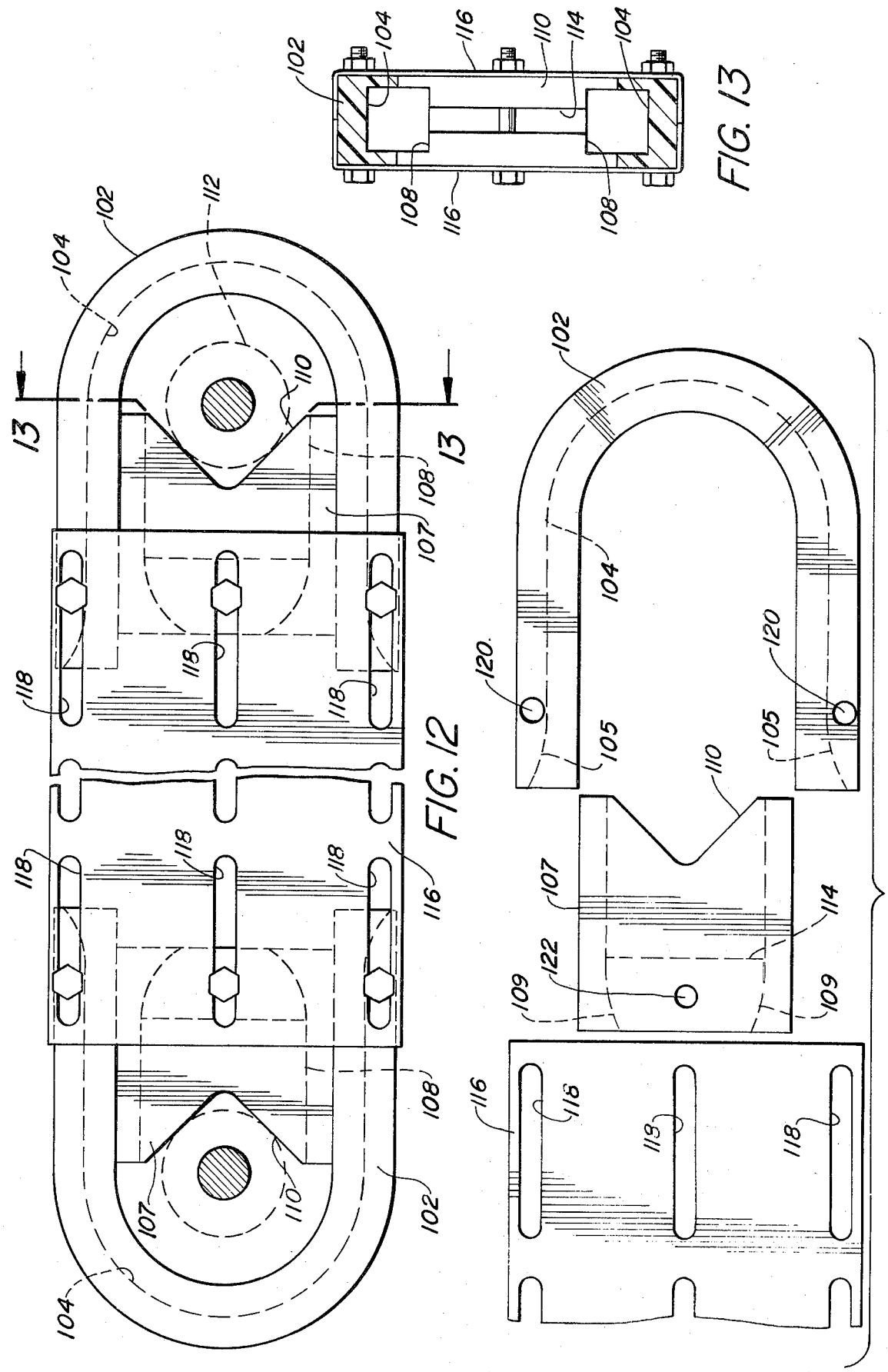

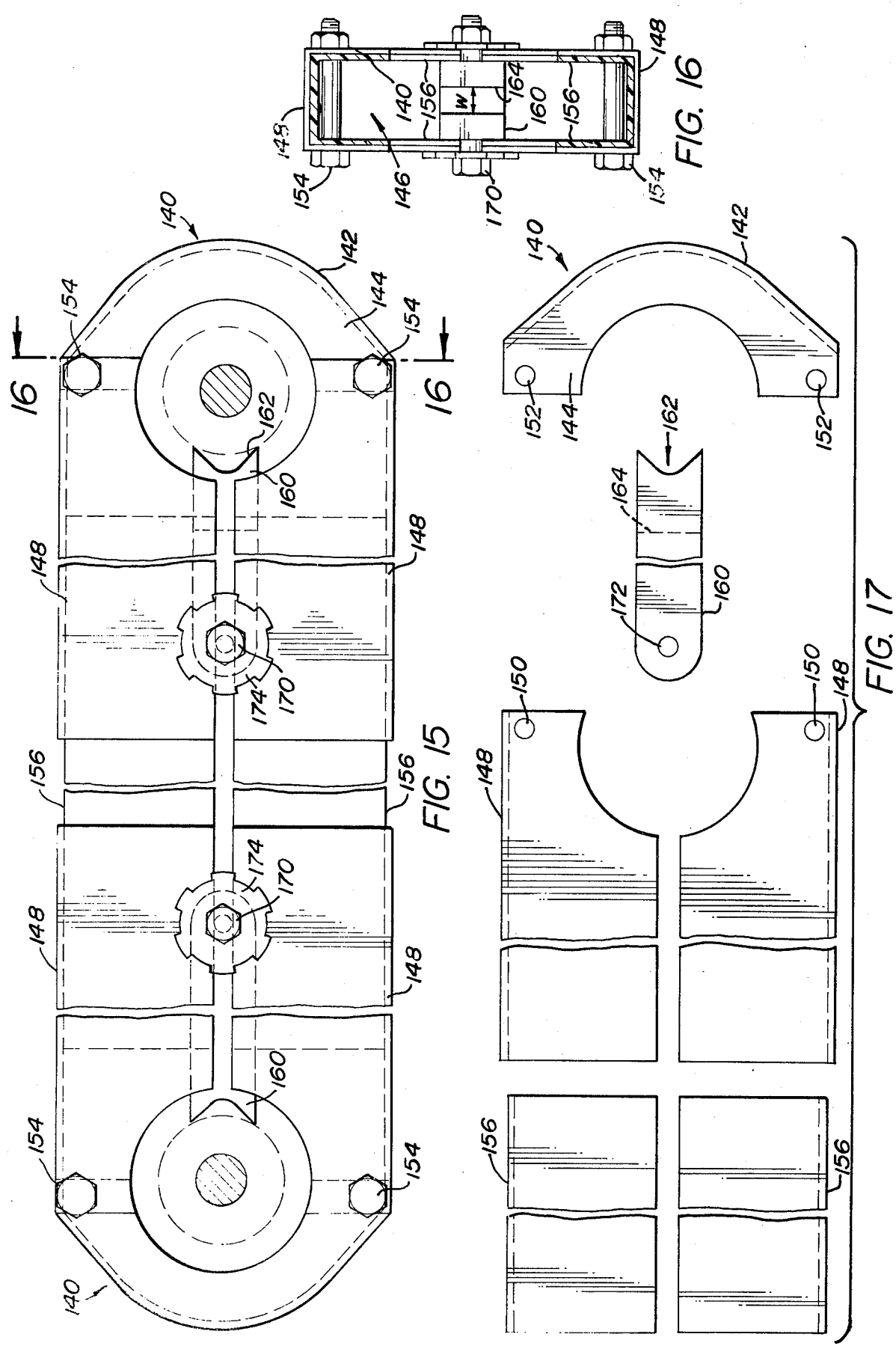

GUARD ASSEMBLY FOR ENDLESS FLEXIBLE DRIVE MEMBERS

This is a continuation of application Ser. No. 338,873, filed Mar. 7, 1973.

The subject invention is directed toward the art of safety devices and, more particularly, to a guard for chain or belt-type drive systems.

The invention is especially suited for use as a chain guard for installation on existing equipment and will be described with particular reference thereto; however, as will become apparent, the invention is capable of broader application.

Recent safety regulations require that the sprockets of exposed chain drives be enclosed both front and rear. On many existing machines, the guards were designed to cover only the front of the drive. Consequently, some of these machines do not meet present requirements.

In order to bring existing plants into compliance with the new regulations, it has been necessary to design and install new guards. Normally, each guard required is a separate design and manufacturing problem because of the variations in the associated support structure on which the guards must be mounted. This has made it extremely time consuming and expensive to bring the plants into compliance.

The subject invention overcomes the above-mentioned problems and provides a guard which is supported directly from the chain or belt and the drive shaft. As a consequence, it is not necessary to custom design each guard for a particular installation. Rather, a selection of guards for standard pulley or sprocket sizes is sufficient.

In general, the invention contemplates a guard for a shaft mounted circular rotary power transmitting element (e.g., a pulley or sprocket) over which passes a flexible, endless, orbiting power transmitting member (e.g., a belt or chain). The guard preferably comprises a housing assembly having a pair of closed side wall portions positioned on axially opposite sides of the circular power member and each sized to extend radially outwardly of the shaft a distance greater than the maximum radial extent of the circular power member. Additionally, at least a portion of the side walls extend outwardly along opposite sides of the flexible power member. A connecting wall portion extends between the side wall portions at a location radially outwardly of the rotary power member. The guard is supported in position by at least two bearing surfaces including a first carried in one of the side walls and rotatably receiving the shaft, and a second connected to the guard and engaging the flexible drive member.

Preferably, and in accordance with a more limited aspect of the invention, the bearing surfaces are formed from a plastic material such as Delrin or nylon. The invention also contemplated that the entire guard can be formed from such material, for example, by injection molding.

The bearing surfaces which support the guard on the drive can have different arrangements if desired. For example, the side walls can each have an opening and bearing surface which engage the drive shaft on opposite sides of the circular power member. On certain standard sprockets a large hub extends laterally outwardly from one side. The guard can be arranged to ride on the hub if desired. Moreover, the outer free end of the guard which encloses the runs of the chain can merely having a bearing surface which engages the chain. For example, the inner surface of the connecting wall can rest directly on the chain.

The house assembly can, of course, be split along different lines into two or more components to facilitate manufacture and/or installation. For example, in one embodiment of the subject invention the assembly is formed of two identical halves which separate along a plane in which the axis of the sprocket shaft lies and which is generally midway between the upper and lower runs of the chain. This allows the guard to be installed without removing the sprocket or chain. Note that the two halves can be merely fitted over the sprocket and chain and joined along their mating lines. In a second embodiment they are adapted to split along a plane parallel to the sprocket or pulley. In both of the embodiments, however, all support for the guard is obtained from the shaft and the endless power element.

As is readily apparent from the foregoing, the entire guard can be supported from the moving drive elements independently of any stationary associated structure. Thus, merely with a selection of guards sized for standard pulleys and sprockets, nearly any guard requirement can be met. This eliminates engineering design time, as well as simplifying installation.

Accordingly, a primary object of the invention is a guard for rotary power elements of the type discussed which guard does not require support from any stationary associated structure.

A further object is a guard of the general type described which is extremely simple to manufacture and install.

Yet another object is the provision of a guard which can be formed as a simple two-piece structure by conventional molding techniques.

A still further object of the invention is a guard which can be quickly installed on existing machinery without disassembly of the machinery.

The aforementioned and other objects and advantages will become apparent from the following description when read in conjunction with the accompanying drawings wherein:

FIG. 1 is a pictorial view showing a preferred embodiment of the guard assembly positioned about a sprocket and chain drive power transmission;

FIG. 2 is a cross-sectional view taken on line 2—2 of FIG. 1;

FIG. 3 is a cross-sectional view taken on line 3—3 of FIG. 1;

FIG. 4 is a cross-sectional view taken on line 4—4 of FIG. 1;

FIG. 5 is a partial cross-sectional view taken on line 5—5 of FIG. 3;

FIG. 6 is a view similar to FIG. 1 but showing a modified form of the invention;

FIG. 7 is a cross-sectional view taken on line 7—7 of FIG. 6;

FIG. 8 is a cross-sectional view taken on line 8—8 of FIG. 7;

FIG. 12 is a side elevational view similar to FIG. 10 but illustrating a modified form of the guard assembly as used for totally enclosing both sprockets and the upper and lower runs of the chain;

FIG. 13 is a cross-sectional view taken on line 13—13 of FIG. 12;

FIG. 14 is an exploded view showing the components of the guard assembly of FIG. 12;

FIG. 15 is a side elevational view similar to FIG. 10 but illustrating a modified form of guard assembly which encloses both sprockets and the upper and lower runs of the chain;

FIG. 16 is a cross-sectional view taken on line 16—16 of FIG. 15 (the sprocket and chain are not shown in this view); and, FIG. 17 is an exploded side view showing the major components which are used in the embodiment of FIG. 15.

Figure 10:
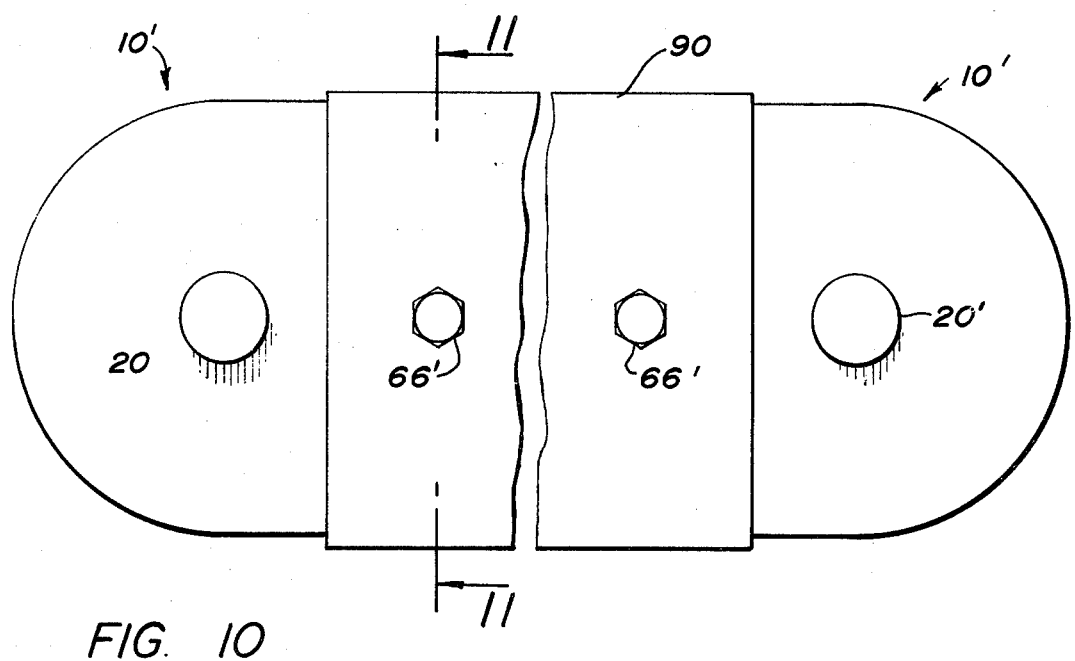
FIG. 10 is an elevational view showing how the inventive guard can be used to provide a totally enclosed guard.

Referring more particularly to the drawings wherein the showings are for the purpose of illustrating preferred embodiments of the invention only and not for the purpose of limiting same. FIGS. 1-5 show the preferred embodiment of the invention and illustrate a guard 10 assembly positioned about and enclosing a sprocket and chain-type drive assembly 12. The drive assembly 12 includes a sprocket 14 of conventional design having a toothed sprocket 16 carried from an enlarged hub 18 (see FIG. 4) which is keyed or otherwise positively connected to a rotary shaft 20. The chain 22 is illustrated as a conventional roller chain which passes about the sprocket and has its upper and lower runs 22a and 22b extending to a second driving or driven sprocket not shown.

In the embodiment under consideration, the guard 10 assembly includes a pair of side wall portions 26 and 28 which, preferably, extend generally parallel to the sprocket and are spaced outwardly a short distance therefrom on axially opposite sides. It should be noted that each of the side wall portions 26 and 28 have a radial extent such that they extend beyond the maximum radial dimension of the sprocket. Moreover, they preferably have a substantial length along the upper and lower runs of the chain. It should be noted that the side wall portion 28 defines a bore or opening 32 which closely receives the hub of the sprocket. The inner surface of the bore 32 is a bearing surface and rotatably receives the hub. As will hereafter become apparent, the bore 32 could be arranged to engage only the shaft if desired. The wall 28 has a similar bore 36. The bore 36 includes a bearing surface which rotatably receives the stub end of the shaft 20.

Extending between the side wall portions 26 and 28 is a connecting wall portion 48 which totally encloses the sprocket and extends outwardly to the ends of the outermost portion of the side walls. As best shown in FIG. 2, the ends 49 and 51 of the side wall 48 are preferably curved slightly as shown.

In the embodiment shown, the end 49 rides against the top surface of the upper run 22a of the chain. This is best shown in dot-dashed lines in FIG. 3. The portions of the guard which engage the chain should be formed from a bearing material such as Delrin or nylon. However, in the subject embodiment the entire guard is formed from Delrin.

As apparent from the foregoing, the guard assembly is entirely supported from the shaft 20 and the upper run 22a of the chain 22. Thus, the guard assembly can be used irrespective of the surrounding machine structure and without regard to the particular type of associated support members.

As discussed earlier, the guard assembly can be made from a plurality of individual components. In the FIGS. 1-5 embodiment, a guard assembly 10 is formed from two half sections 38 and 39 which join along line 40. This arrangement permits the guard assembly to be installed on the drive merely by fitting the two half sections 38 and 39 over the sprocket and chain without removal of any drive elements.

The two half sections 38 and 39 are joined together by an intermediate connecting member 52 best seen in FIGS. 2, 3 and 5. Note that connector member 52 is sized so as to be closely received between the side walls 26 and 28. The width of member 52 is such as to provide ample space for free passage of the runs of the chain. The left-hand end of member 52 (as viewed in FIGS. 2 and 5) includes a recess or groove 54 which is sized to closely receive the lateral sides of sprocket 16. The depth of groove 54 is sufficient to provide clearance from the outer periphery of the sprocket. Thus, member 52 serves as a guide to prevent lateral movement of the guard and, additionally, prevents foreign objects from being inserted into the guard.

A pair of bolts or the like 56 and 58 extend through the half sections 38 and 39 and the connecting member 52. This arrangement holds the guard assembly rigidly together.

A second embodiment of the invention is shown in FIGS. 6-8. In this embodiment, the same reference numerals have been used to identify parts corresponding to those described with reference to the FIGS. 1-5 embodiment; however, the numerals are differentiated therefrom by a prime suffix. A description of a corresponding FIG. 1 element is to be taken as equally applicable to FIGS. 6-8 embodiment unless otherwise noted. In particular, the guard assembly 10' of FIG. 6 is formed of two half sections 60 and 61 which mate along line 62. Each of the sections 60, 61 define a separate one of the side walls 26', 28' and a portion of the interconnecting wall 48'. In this embodiment, the two sections 60, 62 are joined together by a single bolt 66 which extends through aligned openings in each of the sections. It should be noted that the assembly is permitted to have some lateral freedom of movement on the hub 18' and the stub end of shaft 20'. However, both of the sections 60 and 61 are formed from a plastic having good lubricity and bearing characteristics. Thus, engagement of the sides of the chain by the inner walls of the guard assembly has little or no effect on the chain movement.

Figure 9:
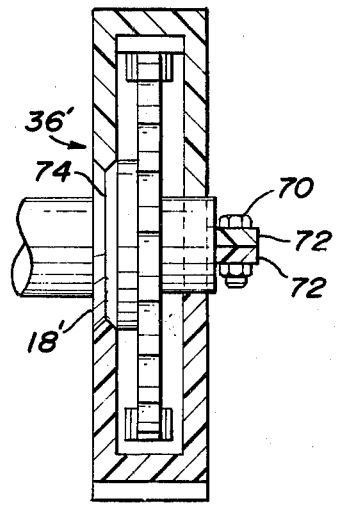
FIG. 9 is a cross-sectional view similar to FIG. 8 but showing a modified form of the invention.

FIG. 9 is a cross-sectional view similar to FIG. 8 but showing a modified form of the invention in which the guard assembly is split along the line corresponding to line 40 of FIGS. 1-5 embodiment. However, in this embodiment the two half sections are joined by one or more vertically extending bolts 70 which pass through outwardly extending tabs 72 carried on or formed integrally with the sections defining the guard. To prevent lateral movement in this embodiment, the hub 18' has a groove 74 formed about its outer periphery. The opening 36' is contoured to extend into the groove 74. This arrangement prevents lateral movement of the unit on the drive shaft.

Figure 11:
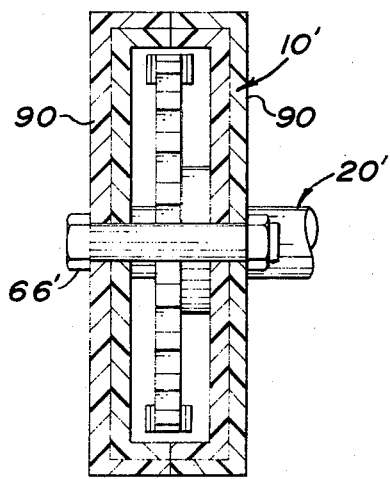
FIG. 11 is a cross-sectional view taken on line 11—11 of FIG. 10.

FIGS. 10 and 11 illustrate an arrangement wherein two of the improved guard assemblies can be interconnected to provide a totally enclosed guard for the entire upper and lower runs and both sprockets. Specifically, the two guards 10 are interconnected by a pair of channel-shaped members 90. Members 90 are sized so as to fit closely over the exterior surface of the ends of each guard 10. Channel members 90 can be formed from any desired material but are shown as plastic.

Preferably, the members 90 are cut to the required length after the guards 10 have been installed. Suitably located openings are drilled in members 90 so that the bolts which connect guards 10 can be used to hold members 90 in position. By the use of this arrangement, totally enclosed guard assemblies of any desired length can be quickly field fabricated.

FIG. 12 illustrates a guard assembly 100 which is somewhat similar to the guard assembly of FIG. 10. However, this assembly is designed to permit it to be more readily adapted to varying distances between sprockets or pulleys. In particular, the guard assembly 100 includes a pair of generally U-shaped end members 102 having an internal recess or groove 104 formed therein. Groove 104 is preferably of a width slightly greater than the width of the chain. The depth of groove 104 is also preferably such that when member 102 is in position, the entire chain and teeth portions of the sprocket are enclosed in the manner shown.

Associated with each of the U-shaped members 102 is a guide block member 106 adapted to be closely received between the legs of member 102. Guide block 106 has grooves 108 formed in its laterally opposite edges and sized generally in the manner of the previously mentioned groove 104. It should be noted that the ends of grooves 104 and 108 are preferably tapered as shown at 105 and 109, respectively. A V-shaped locating surface 110 is formed in the end of guide block 107 and is adapted to engage the outer surface of the sprocket hub 112. The sprocket itself is received in a recess 114 which extends inwardly from surface 110. The laterally opposite sides of recess 114 engage the sides of the sprocket to maintain the guard assembly 100 properly centered relatively thereto.

Each of the U-shaped members 102 and the guide blocks 107 are maintained in position by a pair of U-shaped members 116 which extend over the ends in the manner shown. Members 116 serve to totally enclose the upper and lower runs of the chain between the sprockets. Preferably, members 116 are provided with a series of elongated bolt openings 118 positioned in the manner illustrated. Corresponding located openings 120 and 122 are formed in the U-shaped members 102 and the guide blocks 107, respectively. As can be appreciated, this arrangement permits adjustment of the spacing distances between the sprockets without modification of the guard assembly. Additionally, the channel members 116 can be formed in long lengths and cut to length as required.

Although illustrated as extending between two sprockets, the guard assembly of FIG. 13 can be formed in the manner of the guard assembly of FIG. 10; that is, one of the U-shaped members 101 and its associated guide block 107 can be eliminated if desired. Additionally, although not of particular importance to the invention, the channel members 116 can be formed with only a limited number of bolt receiving openings or custom-made for each installation.

The embodiment shown in FIGS. 15–17 is quite similar to the FIGS. 12–14 embodiment. As shown, the chain guard assembly of this embodiment comprises a pair of generally identical end members 140 which are sized to fit over the sprockets. The end members include a relatively heavy end wall 142 and a pair of side walls 144 which define a recess 146 of a size and configuration to receive the sprocket and chain. Connected to each of the end members 140 are a pair of identically configured channel-like members 148. Channel members 148 include bolt hole openings 150 adapted to be aligned with similar openings 152 formed in the end members 140. Suitable bolts or the like 154 extend through the openings and serve to connect channel members 148 with associated end members 140. It should be noted that the channel-shaped members 148 are sized so that their longitudinally-shaped recesses closely receive the end members 140 as best shown in FIG. 16. Extending between the channel-shaped members 148 associated with each of the sprockets are a second pair of elongated channel members 156 which, in the embodiment under consideration, can be simple extrusions cut to a suitable length depending on the spacing between the two sprockets. The channel members 156 are sized so that they can be received within the recesses of the channel members 148.

The guard components thus far described will totally enclose the chain. The assembly is maintained in the proper position relative to the sprockets and chain by bearing and positioning block members 160 which are preferably formed from nylon or a similar plastic and have a V-shaped end 162 and an axially extending recess 164. Recess 164 is sized so that its width W is only slightly larger than the thickness of the associated sprocket. Members 160 are positioned as shown in FIGS. 15 and 16. Note that the V-shaped end 162 engages the sprocket hub and serves to position the chain guard assembly vertically relative to the sprockets (as viewed in FIG. 1). Lateral stability and guidance of the assembly is achieved by the recess 164 which receives the sprocket and holds the assembly against axial movement relative to the sprockets. The members 160 are releasably locked into position and hold the components of the guard assembly in their proper relationship through the use of bolts 170. As illustrated in FIGS. 15 and 16, bolts 170 pass through openings 172 in the members 160 and suitable lock washers 174 are positioned on the bolt to engage opposite sides of the channel members 148. Tightening of the bolts clamps the channel members 148 and 156 to the blocks 160.

The above-described arrangement permits the spacing between the sprocket shafts to be adjusted without alteration of the guard merely by releasing bolts 170 slightly and sliding the ends of the assembly relative to the channel members 156.

Although not shown in the drawings, the guard assemblies can be arranged to prevent operation of associated machines when they are removed. For example, contacts can be molded into mating guard components and used to complete the electrical power circuit to the drive motors. Upon separation of the components, power to the machine is disconnected.

The invention has been described in great detail sufficient to enable one of ordinary skill in the art to make and use the same. Obviously, modifications and alterations of the preferred embodiment will occur to others upon a reading and understanding of the specification and it is our intention to include all such modifications and alterations as part of our invention insofar as they come within the scope of the appended claims.

We claim:

1. A guard for drive systems of the type including a shaft mounted, generally circular, rotatable power member about which travels an endless, flexible power transmitting member, said guard comprising:
   a pair of side wall portions positioned on axially opposite sides of said power member and extending generally parallel thereto, said wall portions having a radial extend greater than the maximum radial extent of said generally circular power member;
   an opening formed through at least one of said wall portions and sized to receive said shaft, the inner periphery of said opening being defined by a bearing surface which rotatably receives said shaft;
   a connecting wall portion extending between said side wall portions at a location radially outwardly of said generally circular power member and enclosing the generally circular power member;
   a second bearing surface carried by said guard and engaging said endless power transmitting member at a location spaced a substantial distance from said generally circular power member; and,
   an intermediate connector portion extending between said side wall portions.

2. An improved guard as defined in claim 1 wherein said housing is formed entirely from a plastic.

3. An improved guard as defined in claim 1 wherein said housing is formed in two sections separable generally along a plane parallel to the plane of rotation of said circular power member.

4. An improved guard as defined in claim 1 wherein said housing is formed in two sections separable generally along a plane perpendicular to the plane of rotation of said circular power member.

5. An improved guard as defined in claim 1 wherein said guard is formed in two sections interconnected by manually releasable connecting means.

6. An improved guard as defined in claim 1 wherein said bearing surfaces are an integral portion of said housing.

7. The guard as defined in claim 1 wherein said first and second bearing surfaces are formed from plastic.

8. The guard as defined in claim 1 wherein said housing is prevented from moving axially on said shaft by radially extending interengaging portions on said shaft and said housing.

9. In a drive system including a pair of shaft mounted, generally circular, rotary power members about which travels an endless flexible power transmitting member, an improved guard assembly comprising:
   a pair of housing members substantially totally enclosing each of said circular power members;
   separate bearing surfaces carried by each of said housings and rotatably receiving the respective shaft of the associated rotary power member, said bearing surfaces each supporting the respective housing;
   side wall members extending between each of said housing members and releasably connecting said housing members; and,
   guide means positioned within said housing members and slidably receiving said rotary power members for limiting axial movement of said housing members relative to the associated shaft.

10. The drive system of claim 9 wherein said guide means receive a radial portion of the associated power member, said guide means being releasably mounted within said housing members.

11. The drive system of claim 9 wherein said guide members include a guide surface for engaging the associated shaft to prevent radial movement of said housings relative to the associated shaft.

* * * * *